Patented Oct. 21, 1930

1,778,760

UNITED STATES PATENT OFFICE

GEORGE SAMUEL HAY, OF LONDON, ENGLAND, ASSIGNOR, BY MESNE ASSIGNMENTS, TO FLINTKOTE ROADS INC., OF BOSTON, MASSACHUSETTS, A CORPORATION OF MASSACHUSETTS

BITUMINOUS EMULSION

No Drawing. Application filed November 5, 1925, Serial No. 67,181, and in Great Britain December 16, 1924.

This invention consists in improvements in or relating to bituminous emulsions, and has for its object to render such emulsions more stable during storage and transportation in bulk.

The invention provides a method of increasing the stability of a bituminous emulsion which consists in mixing with said emulsion, either before or after the dilution of the emulsion with water, a small proportion of a reagent which is soluble in or miscible with the liquid phase of the emulsion (i. e. water in the case of an aqueous emulsion) and is capable of lowering the freezing point of the emulsion without causing disruption thereof.

The invention is principally concerned with aqueous bituminous emulsions and as applied thereto the invention consists in mixing with the aqueous emulsion, either before or after the dilution of the emulsion with water, a proportion up to about 10% (and preferably in the region of or less than 5%) of a reagent which is soluble in or miscible with water, which has the property of lowering the freezing point of water, but which is not an "electrolyte".

Any one of the following compounds or any mixture of two or more of them, may be used as the stabilizing reagent in carrying out the invention:—monohydric, dihydric or polyhydric alcohols corresponding to the primary members of the paraffin, olefine or acetylene series (e. g. allyl-alcohol, Montan-wax, alcohol, glycol, glycerine); cyclohexanol or other hydrogenated phenols; glucoses, fructose and other sugars; starch, dextrin and other soluble carbohydrates. In general the reagents which may be employed according to the invention belong to the class of alcohols of low molecular weight (particularly polyhydric alcohols) and water-soluble carbohydrates.

The compounds specified above satisfy the requirements necessary for carrying out the invention, that is to say they are all water-soluble or water-miscible compounds, they have the property of lowering the freezing point of water and at the same time they do not act as electrolytes on the emulsion. The term "electrolyte" is used herein to signify all substances which, if added to the emulsion to be treated, would cause disruption thereof. As will be understood, there are many compounds for example salts such as calcium chloride, common salt and potassium iodide, which lower the freezing point of water but which are not suitable for the purposes of the present invention because if incorporated with an emulsion they would effect disruption thereof. It will be appreciated that in some cases it may be necessary to carry out a simple preliminary test in order to ascertain the suitability or otherwise of a particular reagent, that is to say in order to ascertain whether or not such reagent satisfies the essential requirements specified above.

In carrying out this invention it is preferable that the compound selected as the stabilizing reagent should have a solvent action upon the bitumen. The various alcohols specified herein act, in varying degrees, as solvents for bitumen, but reagents of the carbohydrate class do not possess this property.

Some examples according to this invention will now be described:

Example I

The emulsion to be treated was prepared from Mexican asphalt according to the process described in British Patent No. 202021. This process consisted in melting the asphalt at a temperature of 215°–225° F. and adding to it with agitation, first a small proportion of fatty acid, then a dilute solution of alkali and finally a quantity of water sufficient to bring up the water content in the finished or diluted emulsion to 60–100 parts per 100 of the asphalt. After the completion of the above process glycerine was incorporated with the emulsion as the stabilizing reagent. The proportion of glycerine was about 2% reckoned by weight on the total quantity of the emulsion treated. From a test it was ascertained that the freezing point of the emulsion had been reduced to −5° C. In carrying out this test a sample of the emulsion was completely frozen and then allowed to thaw, and even under this comparatively drastic treatment the emulsion was not broken down.

The above example was also carried out in the following modified form with equally satisfactory results. Instead of adding the glycerine after the dilution of the emulsion, it was incorporated during the dilution of the emulsion, that is to say it was mixed with the water before the latter was run into the emulsion.

Example II

In this case allyl-alcohol was employed as the stabilizing reagent, 1% (reckoned by weight on the emulsion) of this compound being incorporated with an emulsion prepared by the process described in British Patent No. 202021 aforesaid. The freezing point of the emulsion was thereby reduced to —3° C.

Example III

In carrying out this example 2% (reckoned by weight of the emulsion) of cyclohexanol was incorporated with an emulsion prepared according to British Patent No. 202021 aforesaid. The freezing point of the emulsion was found to be —5° C. and on carrying out a freezing test similar to that described in Example I it was found that the emulsion remained intact even after it had been completely frozen and then allowed to thaw.

Example IV

Dextrin was added to an emulsion prepared as before, and with 3% dextrin reckoned by weight on the total emulsion the freezing point was reduced to —2.6° C. A freezing test similar to that described in Example I was carried out on the emulsion to which dextrin had been added and it was found that the emulsion was still intact after being completely frozen and then allowed to thaw.

Example V

With 5% molasses (reckoned by weight on the emulsion) added to an emulsion prepared as before the freezing point was reduced to —4° C. Similarly where 4% glucose was employed as the stabilizing reagent the freezing point was reduced to —3° C. In these two cases the added re-agents, in addition to their stabilizing effect, rendered the emulsion distinctly thicker. Freezing tests were carried out with samples prepared according to both of these examples, and in each case it was found that the emulsion was proof against disruption under the conditions of the test.

In each of the foregoing examples the freezing point of the emulsion before addition of the stabilizing reagent was approximately 0° C.

This invention includes a bituminous emulsion (however prepared) containing a small proportion of a stabilizing reagent comprising one or more compounds of the classes specified herein.

What I claim as my invention and desire to secure by Letters Patent is:—

1. A bitumen-in-water emulsion capable of withstanding freezing and thawing without disruption, comprising bitumen of the type artificially prepared from petroleum, water as the continuous phase of the emulsion, a proportion less than 10% reckoned on the bitumen of an emulsifying agent in saponified form, and a proportion of not more than 10% reckoned on the emulsion of a reagent of the class of alcohols of low molecular weight and water soluble carbo-hydrates.

2. A bitumen-in-water emulsion capable of withstanding freezing and thawing without disruption, comprising bitumen of the Mexican asphalt type, water as the continuous phase of the emulsion, a proportion less than 10% reckoned on the asphalt of an alkali soap of a fatty acid, and a proportion up to 5% of glycerine, the whole being an intimate mixture which is liquid in the cold, is miscible with water, and pours readily.

3. The method of stabilizing a bitumen-in-water emulsion to permit freezing and thawing of the same without disruption, which method consists in mixing with the emulsion after the completion of the emulsification step, a proportion up to 10% of a water soluble compound which has the property of lowering the freezing point of water without acting as an electrolyte.

4. The method of increasing the bulk stability of a bitumen-in-water emulsion without reducing the rapidity with which the emulsion will set when applied to a porous foundation, which method consists in mixing with the emulsion after the completion of the emulsification step, a proportion of about 5% of a water soluble compound having the property of lowering the freezing point of the aqueous phase of the emulsion and which has a solvent action on the bitumen.

5. The method of increasing the stability of a bitumen-in-water emulsion to lower the freezing point thereof and to permit the same to withstand freezing and thawing without disruption, which consists in mixing with said emulsion after the completion of the emulsification step, a proportion up to about 10% of a reagent belonging to the class of alcohols of low molecular weight and water soluble carbo-hydrates.

6. The method of increasing the stablity of a bitumen-in-water emulsion to lower the freezing point thereof and to permit the same to withstand freezing and thawing without disruption, which consists in mixing with said emulsion after the completion of the emulsification step, an effective proportion up to about 10% of a polyhydric alcohol.

7. The method of increasing the stability of a bitumen-in-water emulsion to lower the freezing point thereof and to permit the same to withstand freezing and thawing without disruption, which consists in mixing with said emulsion after the completion of the emulsification step, an effective proportion up to about 10% glycerine.

8. The method of producing a bitumen-in-water emulsion capable of withstanding freezing and thawing without disruption, which consists in rendering the solid bitumen molten by heat, adding to the molten bitumen a small proportion of an emulsifying agent saponifiable with alkali, effecting saponification of the emulsifying agent in situ by the addition to the molten bitumen of a dilute solution of alkali, and finally mixing with the emulsion a proportion up to about 10% of a water soluble compound which has a solvent action on the bitumen, and the property of lowering the freezing point of water.

9. The method of producing a bitumen-in-water emulsion capable of withstanding freezing and thawing without disruption, which consists in melting bitumen of the Mexican asphalt type, adding with agitation to the molten bitumen a proportion up to about 5% of a fatty acid, and a dilute aqueous solution of alkali, maintaining the heat and agitation of the mixture until emulsification has been effected, and thereafter incorporating with the emulsion an effective proportion of glycerine up to 5%.

10. An aqueous dispersion comprising bitumen-pitch particles as the dispersed phase and water as the continuous phase thereof and containing in the external phase alcohol substantially less than 10% miscible with the water in the external phase, the quantity of alcohol being insufficient to prevent freezing of the dispersion at temperatures substantially below 0° C. but sufficient to prevent injury to the dispersion due to such freezing action as does take place therein at said temperature.

11. An aqueous dispersion comprising bitumen-pitch particles as the dispersed phase and water as the continuous phase thereof and containing in the external phase alcohol substantially less than 5% miscible with the water in the external phase, the quantity of alcohol being insufficient to prevent freezing of the dispersion at temperatures substantially below 0° C. but sufficient to prevent injury to the dispersion due to such freezing action as does take place therein at said temperature.

12. An aqueous dispersion comprising bitumen-pitch particles as the dispersed phase and water as the continuous phase thereof and containing in the external phase volatile alcohol substantially less than 10% miscible with the water in the external phase, the quantity of volatile alcohol being insufficient to prevent freezing of the dispersion at temperatures substantially below 0° C. but sufficient to prevent injury to the dispersion due to such freezing action as does take place therein at said temperature.

13. An aqueous dispersion comprising bitumen-pitch particles as the dispersed phase and water as the continuous phase thereof, and containing in the external phase substantially less than 10% of water soluble organic non-electrolyte capable of depressing the freezing point of the emulsion, the quantity of organic non-electrolyte being insufficient to prevent freezing of the dispersion at temperatures substantially below 0° C. but sufficient to prevent injury to the dispersion due to such freezing action as does take place therein at such temperature.

14. An aqueous dispersion comprising bitumen-pitch particles as the dispersed phase and water as the continuous phase thereof, and containing in the external phase substantially less than 5% of water soluble organic non-electrolyte capable of depressing the freezing point of the emulsion, the quantity of organic non-electrolyte being insufficient to prevent freezing of the dispersion at temperatures substantially below 0° C. but sufficient to prevent injury to the dispersion due to such freezing action as does take place therein at such temperature.

15. An aqueous dispersion comprising bitumen-pitch particles as the dispersed phase and water as the continuous phase thereof and containing in the external phase substantially less than 10% of volatile water soluble organic non-electrolyte capable of depressing the freezing point of the emulsion, the quantity of organic non-electrolyte being insufficient to prevent freezing of the dispersion at temperatures substantially below 0° C. but sufficient to prevent injury to the dispersion due to such freezing action as does take place therein at such temperature.

In testimony whereof I affix my signature.

GEORGE SAMUEL HAY.